United States Patent [19]

Siebert

[11] Patent Number: 5,427,863
[45] Date of Patent: Jun. 27, 1995

[54] POLYMER BLENDS FOR AUTODEPOSITED COATING

[75] Inventor: Elizabeth J. Siebert, Troy, Mich.

[73] Assignee: Henkel Corporation, Plymouth Meeting, Pa.

[21] Appl. No.: 949,677

[22] Filed: Sep. 23, 1992

[51] Int. Cl.⁶ .............................................. B32B 15/08
[52] U.S. Cl. ................ 428/463; 427/372.2; 427/340; 427/388.4; 427/435; 524/521; 524/527; 524/568
[58] Field of Search ............. 427/372.2, 340, 388.4, 427/435; 428/463; 524/521, 527, 568

[56] References Cited

U.S. PATENT DOCUMENTS

| | | | |
|---|---|---|---|
| 3,592,699 | 7/1971 | Steinbrecher et al. | 148/6.2 |
| 3,617,368 | 11/1971 | Gibbs et al. | 117/161 UT |
| 3,709,743 | 1/1973 | Dalton et al. | 148/6.2 |
| 3,922,451 | 11/1975 | Anschutz et al. | 428/35 |
| 4,103,049 | 7/1978 | Nishida et al. | 427/341 |
| 4,191,676 | 3/1980 | Hall | 260/29.7 |
| 4,347,172 | 8/1982 | Nishida et al. | 524/319 |
| 4,373,050 | 2/1983 | Steinbrecher et al. | 524/405 |
| 4,411,937 | 10/1983 | Nishida et al. | 427/435 |
| 4,434,268 | 2/1984 | Doroszkowsky et al. | 524/520 |
| 4,543,386 | 9/1985 | Padget et al. | 524/523 |
| 5,164,234 | 11/1992 | Siebert | 427/419.8 |

Primary Examiner—Peter D. Mulcahy
Attorney, Agent, or Firm—Ernest G. Szoke; Wayne C. Jaeschke; Norvell E. Wisdom, Jr.

[57] ABSTRACT

The corrosion resistance, and also often the heat resistance, of a autodeposited coating in which the organic binders are predominantly copolymers of vinylidene chloride containing at least 50% vinylidene chloride can be improved by including another type of organic resin binder in the autodeposition bath in sufficient amount to constitute at least 2 up to as much as about 40% of the total of the PVDC and the other organic resin binder. Results can be further improved by rinsing the uncured autodeposited coating with an aqueous treatment solution that has a pH between 7 and 11 and contains between 0.01 and 5% of anions derived from multifunctional organic acids, preferably anions of 1-hydroxyethylidene-1,1-diphosphonic acid, citric acid, tartaric acid, and/or oxalic acid before drying the coating.

8 Claims, No Drawings

POLYMER BLENDS FOR AUTODEPOSITED COATING

BACKGROUND OF THE INVENTION

1. Field of the Invention

This invention relates to autodeposition. Autodeposition involves the use of an aqueous resinous coating composition of relatively low solids concentration (usually less than about 10%) to form a coating of relatively high solids concentration (usually greater than about 10%) on a metallic surface immersed therein, with the coating increasing in thickness and areal density (mass per unit area of coating) the longer the time the metallic surface is immersed in the composition. Autodeposition is somewhat similar to electrodeposition but does not require the aid of external electrical current to cause the resin particles to deposit on the metal surface.

In general, autodepositing compositions are aqueous acid solutions having solid resin particles dispersed therein in very finely divided form. The coating formed while the metal substrate used is immersed in the bath is generally wet and fairly weak, although sufficiently strong to maintain itself against gravity and moderate spraying forces. In this state the coating is described as "uncured". To make an autodeposition coated object suitable for normal practical use, the uncured coated is dried, usually with the aid of heat. The coating is then described as "cured".

The present invention relates more particularly to the use in autodeposition of blends of resins of at least two different chemical types to achieve resistance to corrosion, particularly in environments subject to mechanical shocks, for metallic objects coated with an autodeposited coating. In some of its embodiments, this invention also relates to chemical treatment of an uncured autodeposited coating for the purpose of improving various properties thereof, particularly the adhesion of the coating to the underlying metal substrate and the resistance to corrosion of the underlying metal provided by the cured autodeposited coating when the coated metal surfaced object is subjected to corrosive environments. The chemical treatments used for such a purpose are often called "reactive [or reaction] rinses" in the art. Further details about this aspect of the invention are given in copending U.S. application Ser. Nos. 07/718,676 filed Jun. 21, 1991 and 07/645,435 filed Jan. 24, 1991 by the same applicant. The entire disclosures of these two U.S. Applications, to the extent not inconsistent with any explicit statement herein, are hereby incorporated herein by reference.

2. Statement of Related Art

Basic constituents of an autodepositing composition are water, resin solids dispersed in the aqueous medium of the composition, and activator, that is, an ingredient or ingredients which convert the composition into one which will form on a metallic surface a resinous coating which increases in thickness or areal density as long as the surface is immersed in the composition. Various types of activators or activating systems are known, for example, as reported in the following U.S. Pat. Nos.: 3,592,699; 3,709,743; 4,103,049; 4,347,172; and 4,373,050, the disclosures of which, to the extent not inconsistent with any explicit statement herein, are hereby incorporated herein by reference. The activating system generally comprises an acidic oxidizing system, for example: hydrogen peroxide and HF; $HNO_3$; a ferric-containing compound and HF; and other soluble metal-containing compounds, for example, silver fluoride, ferrous oxide, cupric sulfate, cobaltous nitrate, silver acetate, ferrous phosphate, chromium fluoride, cadmium fluoride, stannous fluoride, lead dioxide, and silver nitrate in an amount between about 0.025 and about 50 grams per liter ("g/l") and an acid, which can be used alone or in combination with hydrofluoric acid, and including, for example, sulfuric, hydrochloric, nitric, and phosphoric acid, and organic acids, including, for example, acetic, chloroacetic, and trichloroacetic acids.

Previously known autodepositing compositions can be used to form coatings which have good aesthetic properties and which protect the underlying metallic substrate from being degraded (for example, corroded by water). However, there are certain applications which require that the autodeposited coating have particularly good properties for satisfactory use. Various means have been developed to improve the properties of autodeposited coatings, including, for example: chemical pretreatment of the metallic surface prior to formation of the coating; selection of particular resins for use in forming the coating; addition to the autodepositing composition of chemical additives; and chemical treatment of the freshly formed or uncured coating, as described in detail in copending application Ser. No. 202,117 filed Jun. 3, 1988 and assigned to the same assignee as this application.

It is an object of this invention to provide metallic surfaces with autodeposited coatings with better adhesion and/or better corrosion resistance than those obtained by following the teachings of the prior art, particularly in environments where the autodeposited coating is subject to mechanical damage. In such situations, it has been observed that autodeposited coatings often are susceptible to spotwise failures of protection against corrosion.

DESCRIPTION OF THE INVENTION

In this description, except in the specific examples or where expressly indicated to the contrary, all numbers specifying amounts of materials or conditions of reaction or use are to be understood as modified by the term "about" in determining the broadest scope of the invention. Practice of the invention within the exact numerical limits given is generally preferred.

SUMMARY OF THE INVENTION

In one major embodiment of the present invention, improvements in corrosion resistance of cured autodeposited coatings after mechanical stress are achieved by utilizing autodeposition baths containing resins predominantly of the poly{vinylidene chloride} (hereinafter often denoted "PVDC") type but also containing resins of at least one other distinct chemical type, such as acrylates, epoxy resins, styrene-butadiene rubbers (hereinafter often denoted "SBR"), poly{vinyl chloride}, and the like. Each of these types of resin may also contain residues of comonomers in addition to residues of those predominant types of monomers from which the polymer type is named.

In many cases, the heat resistance of the autodeposited coatings according to this invention has been found to be superior to those of autodeposited coatings containing only one of the types of resin used in the blended resin coatings according to this invention.

Various embodiments of the invention include processes of autodepositing a superior coating from an autodeposition bath containing blended resins, such autodeposition baths, concentrates of blended resins for preparing such autodeposition baths, and articles of manufacture comprising initially metallic surfaces that are protected against corrosion and other adverse effects of their environments by coatings combining such mixed resins.

DESCRIPTION OF PREFERRED EMBODIMENTS

Preferred autodeposition baths according to the present invention contain particles of resin are dispersed in an aqueous acidic solution which is prepared by combining hydrofluoric acid and a soluble ferric iron-containing ingredient, most preferable ferric fluoride.

U.S. Pat. Nos. 4,347,172 and 4,411,937, which disclose the activating system preferred for use in this invention, disclose the optional use in the composition of an oxidizing agent in an amount to provide from about 0.01 to about 0.2 oxidizing equivalent per liter of composition. Examples of suitable oxidizing agents are hydrogen peroxide, dichromate, permanganate, nitrate, persulfate, perborate, p-benzoquinone and p-nitrophenol. Hydrogen peroxide is generally preferred.

The preferred blends for use in this invention are those of SBR and PVDC, and the amount of SBR in the blend is preferably from 2 to 50, more preferably from 10 to 16, still more preferably from 11 to 15, or most preferably from 12–14, % by weight of the total of the SBR and PVDC solids in the blend. (Hereinafter in this description, all percent values refer to percent by weight unless they are expressly stated to refer to some other basis.)

Preferred PVDC resins for use in the present invention comprise internally stabilized vinylidene chloride copolymers or externally stabilized vinylidene chloride copolymers containing in excess of 50%, or more preferably at least 80%, of vinylidene chloride. Most preferably, the vinylidene chloride copolymer is crystalline in nature. Exemplary crystalline resins are described in U.S. Pat. Nos. 3,922,451 and 3,617,368. Generally, crystalline vinylidene chloride-containing resins comprise a relatively high proportion of vinylidene chloride, for example, at least about 80% thereof.

Internally stabilized polymers or resins include as part of their chemical structure a surfactant group which functions to maintain polymer particles or resin solids in a dispersed state in an aqueous medium, this being the function also performed by an "external surfactant", that is, by a material which has surface-active properties and which is absorbed on the surface of resin solids, such as those in colloidal dispersion. As is known, the presence of an external surfactant tends to increase the water sensitivity of coatings formed from aqueous resin dispersions containing the same and to adversely affect desired properties of the coatings. The presence of undue amounts of surfactant in autodepositing compositions can lead to problems, as described in U.S. Pat. No. 4,191,676, the disclosure of which, to the extent not inconsistent with any explicit statement herein, is incorporated herein by reference, particularly as regards its description respecting surfactants and amounts thereof in autodepositing compositions. As discussed in this patent, the presence of an undue amount of surfactant in autodepositing compositions can deter the build-up of resin particles on the metallic surface being coated. In addition, the presence of undue amounts of surfactant can also adversely affect desired coating properties, for example, corrosion resistant properties.

An advantage of internally stabilized vinylidene chloride-containing polymers is that stable aqueous dispersions, including acidic aqueous dispersions of the type comprising autodepositing compositions, can be prepared without utilizing external surfactants. (It is noted that there is a tendency in the literature to use interchangeably the following terms in connection with describing surface active materials which are used in polymerization processes for preparing polymers of the type to which the present invention relates: surfactant, wetting agent, emulsifier or emulsifying agent, and dispersing agent. As used herein, the term "surfactant" is intended to be synonymous with these aforementioned terms.)

Although various ways may be used to introduce into the molecular structure of the vinylidene chloride resin such ionizable groups, it is believed that the most widely used method for preparing such resins will involve reacting vinylidene chloride with a monomeric surfactant and optionally one or more other monomers. In such a reaction, the monomeric surfactant comprises a material which is polymerizable with monomeric vinylidene chloride or with a monomeric material which is polymerizable with monomeric vinylidene chloride and which is ionizable in the reaction mixture and in the acidic aqueous medium comprising an autodepositing composition.

With respect to particular resins that can be used in the coating composition of the present invention, a preferred class can be prepared by copolymerizing (A) vinylidene chloride monomer with (B) monomers such as methacrylic acid, methyl methacrylate, acrylonitrile, and vinyl chloride and (C) a water soluble ionic material such as sodium sulfoethyl methacrylate. Although the constituents comprising the above-desired resin can vary over a relatively wide range, in general the resin will comprise the polymerized constituents in the following amounts:

1) between 45 and about 99 weight percent based on the total weight of monomers used of vinylidene chloride monomer;
2) from about 0.5 to 30 weight percent based on the total weight of (1) and (2) of a second relatively more hydrophilic ethylenically unsaturated monomeric material wherein such monomeric material has a solubility in both the water phase and the oil phase of the polymer latex of at least 1 weight percent at the temperature of polymerization; and
3) from about 0.1 to about 5 weight percent based on the total weight of other monomers of an ionic, significantly water-soluble material which is copolymerizable with (2) and is selected from the group of sulfonic acids and their salts having the formula:

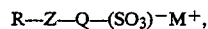

wherein the radical "R" is selected from the group consisting of vinyl and substituted vinyl, for example, alkyl-substituted vinyl; the symbol "Z" represents a difunctional linking group which will activate the double bond in the vinyl group; —Q— is a divalent hydrocarbon moiety having its valence bonds on different carbon atoms; and the symbol "M+" represents a cation.

Examples of resins prepared from such monomers are disclosed in U.S. Pat. No. 3,617,368.

The relatively hydrophilic monomers of 2) above include those materials which are readily copolymerizable with 1) in aqueous dispersion, that is, which copolymerize within a period of about 40 hours at a temperature ranging from the freezing point of the monomeric serum up to about 100° C., and which have a solubility in both the water and the oil phase of the polymer latex of at least 1 weight percent at the temperature of polymerization. Exemplary of preferred materials, particularly when used in conjunction with monomeric vinylidene chloride are methacrylic acid and methyl methacrylate. Other monomers which may be advantageously employed include the hydroxyethyl and propyl acrylates, hydroxyethylmethacrylate, ethyl hexylacrylate, acrylic acid, acrylonitrile, methacrylonitrile, acrylamide, and the lower alkyl and dialkylacrylamides, acrolein, methyl vinyl ketone, and vinyl acetate.

These monomers, which can be employed in amounts of from 0.5 to 30 weight percent, based on the total weight of the nonionic monomers used, provide for the necessary reactivity with the copolymerizable ionic material of (3) and also provide for the required water solubility of the interpolymer in water. Thus, such materials may be referred to as "go-between" monomers. It is to be understood that the optimum amount of such relatively hydrophilic monomers may vary somewhat within the prescribed range depending upon the amount of hydrophobic monomer used in preparing the resin, as well as upon the amount and type of the copolymerizable ionic monomer used.

The copolymerizable ionic monomers used in preparing the aforementioned type resins are those monomeric materials which contain in their structure both an ionizable group and a reactive double bond, are significantly soluble in water, are copolymerizable with the hydrophilic monomer constituent (2) and in which the substituent on the double bond is chemically stable under the conditions normally encountered in emulsion polymerization.

Examples of the aforementioned divalent hydrocarbon moiety having its valence bonds on different carbon atoms include alkylene and arylene divalent hydrocarbon radicals. Although the alkylene [$(CH_2)_x$] group can contain up to about 20 carbon atoms, it preferably has 2 to about 8 carbon atoms.

The solubility of the defined copolymerizable ionic material as described herein is strongly influenced by the cation $M^+$. Exemplary cations are the free acids, alkali metal salts, ammonium and amine salts and sulfonium and quaternary ammonium salts. Preferred are the free acids, alkali metal salts, particularly sodium and potassium, and ammonium salts.

It is further noted that, with one of the ions above, and the usual choices for R and Z, the solubility of the monomer depends on Q. As indicated, this group can be either aliphatic or aromatic and its size will determine the hydrophilic/hydrophobic balance in the molecule, that is, if Q is relatively small, the monomer is water soluble, but as Q becomes progressively larger, the surface activity of such monomer increases until it becomes a soap and ultimately a water insoluble wax. It is to be understood, however, that the limiting size of Q depends on R, Z, and $M^+$. As exemplary of the above, it has been found that sodium sulfoethyl methacrylate is a highly acceptable copolymerizable ionic material for use in the present invention.

Further, the selection of R and Z is governed by the reactivity needed, and the selection of Q is usually determined by the reaction used to attach the sulfonic acid to the base monomer (or vice versa).

Processes for preparing latexes containing resins of the aforementioned type are known, such latexes being commercially available and being referred to herein as "self-stabilizing latexes", that is, latexes the polymeric particles of which contain in the polymer molecule functional groups that are effective in maintaining the polymeric particles dispersed in the aqueous phase of the latex. As mentioned above, such latexes do not require the presence of an external surfactant to maintain the particles in their dispersed state. Latexes of this type generally have a surface tension very close to that of water (about 72 dynes/cm). It has been observed that autodepositing compositions containing such latexes form coatings which build up at a relatively fast rate.

An exemplary method for preparing such latexes involves preparation of an aqueous dispersion by an essentially continuous, carefully controlled addition of the requisite polymerization constituents (including polymerization initiator systems, if desired) to the aqueous medium having the desired pH value, followed by the subsequent addition of the necessary polymerization initiator, to form a polymeric seed latex in order to aid in the control of particle size. When forming such polymeric seed latexes, very small amounts of conventional surfactants, such as alkali soaps or the like, may be incorporated in the aqueous medium to further aid in the attainment of particles of desired size. The addition of such surfactants, however, is not critical for the production of the highly stable, internally stabilized, aqueous colloidal dispersions of polymeric particles of the type described above. In any event, additions of surfactants are preferably limited so that the total amount present in the aqueous phase of the final coating solution is less than the critical micelle concentration, as taught in U.S. Pat. No. 4,191,676. Following the formation of the polymeric seed latex, the remaining polymerization constituents are simultaneously and continuously added under carefully controlled conditions to the aqueous medium.

Highly stable polymer latexes for use in the present invention are characterized by the virtual absence of undesirable coagulum which often results when polymeric latexes are stabilized by conventional water soluble surfactants. Thus, such latexes combine the highly beneficial properties of optimum colloidal stability, reduced viscosities at relatively high polymer solids content, low foaming tendencies, and excellent product uniformity and reproducibility. Such highly stable latexes which are internally stabilized are disclosed, for example, in U.S. Pat. No. 3,617,368.

A preferred embodiment of this invention comprises the use of vinylidene chloride-containing latexes in which a water soluble ionic material such as, for example, sodium sulfoethyl methacrylate is copolymerized with the comonomers comprising the copolymer. Sodium sulfoethyl methacrylate is particularly effective for use with monomeric vinylidene chloride and the relatively hydrophilic monomers methyl methacrylate or methacrylic acid when used in the amounts and in the manner described herein.

Particularly preferred latexes for use in this invention are latexes with about 35 to about 60 weight % solids comprising a polymeric composition prepared by emulsion polymerization of vinylidene chloride with one or more comonomers selected from the group consisting of vinyl chloride, acrylic acid, a lower alkyl acrylate (such as methyl acrylate, ethyl acrylate, butyl acrylate), methacrylic acid, methyl methacrylate, acrylonitrile, methacrylonitrile, acrylamide, and methacrylamide and stabilized with sulfonic acid or sulfonic acid salt of the formula R—Z—$(CH_2)_n$—$(SO_3)^-M^+$, wherein R represents vinyl or lower alkyl-substituted vinyl; Z represents one of the difunctional groups:

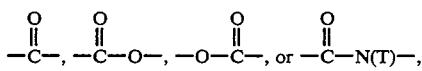

where T represents hydrogen or an alkyl group; n is an integer from 1 to 20 (preferably from 1 to 6), and $M^+$ is hydrogen or an alkali metal cation, preferably sodium or potassium.

A subgroup of preferred polymers are those having at least about 50% by weight of vinylidene chloride, but less than about 70%, and about 5 to about 35% vinyl chloride, and about 5 to about 20% of a vinyl compound selected from the group consisting of acrylic acid, methyl acrylate, ethyl acrylate, butyl acrylate, methacrylic acid, methyl methacrylate, acrylonitrile, methacrylonitrile, acrylamide and methacrylamide, and combinations thereof, and about 1 to about 3% by weight of sulfoethyl methacrylate.

A particularly preferred group of latexes, however, are latexes containing about 30 to about 70 weight % of solids formed by emulsion polymerization of about 50 to about 99% vinylidene chloride based on total weight of polymer and about 0.1 to about 5% by weight of sulfoethyl methacrylate, with optionally other comonomers selected from the group consisting of vinyl chloride, acrylic and methacrylic monomers such as acrylonitriles, acrylamides, methacrylamides and mixtures thereof in amounts between about 5 and about 50% by weight, and substantially free of unpolymerized surfactant or protective colloid.

Among other preferred subclasses of resin for use prior to treatment according to this invention are dispersions of copolymers of about 50 to about 90% by weight of butyl acrylate and about 1 to about 2% by weight of sulfoethyl methacrylate based on the total weight of polymer. Another preferred subclass of polymers are the latexes of vinylidene chloride-containing polymers internally stabilized with sulfoethyl methacrylate and free of other surfactant, and including optionally vinyl chloride and one or more acrylic comonomers.

Another preferred vinylidene chloride-containing copolymer is one comprising about 15 to about 20 weight % vinyl chloride, about 2 to about 5 weight % butyl acrylate, about 3 to about 10 weight % of acrylonitrile, about 1 to about 2 weight % of sulfoethyl methacrylate. This particular copolymer will have less than 70% by weight of vinylidene chloride copolymer based upon total weight of comonomers (including the sulfoethyl methacrylate) used in the emulsion polymerization.

Various types of internally stabilized vinylidene chloride-containing polymers are known and species thereof are available commercially. Examples of such latexes are the DARAN ™ latexes available from W. R. Grace Co. and the SERFENE ™ latexes available from Morton Chemical. In accordance with the present invention, these commercial latexes can be used to excellent advantage, and in general are preferred.

Preferred SBR resins for use in this invention contain from 25 to 85, more preferably from 45 to 70, still more preferably from 60 to 70, most preferably from 65–69, % of styrene residues out of the total of styrene and butadiene residues in the polymer. The SBR resins independently preferably contain at least 0.1, more preferably at least 0.5, still more preferably at least 1.0, % of carboxylate groups, including the stoichiometric equivalent as carboxylate groups of any unionized carboxylic acid groups. Also independently, the glass transition temperature (hereinafter often denoted by the symbol "$t_g$") of the SBR resin used in the invention preferably is in the range from −30 to +11, more preferably from −7 to +11, still more preferably from 0 to +11, °C.

The average particle size of the SBR resin particles in an autodeposition bath according to this invention preferably is in the range from 0.05 to 0.35, more preferably from 0.12 to 0.22, still more preferably from 0.18–0.21, microns (hereinafter often denoted "μm").

The amount of the resin comprising the coating composition can vary over a wide range. The lower concentration limit of the resin particles in the composition is dictated by the amount of resin needed to provide sufficient material to form a resinous coating. The upper limit is dictated by the amount of resin particles which can be dispersed in the acidic aqueous composition. In general, the higher the amount of resin particles in the composition, the heavier the coating formed, other factors being the same. Although coating compositions can be formulated with a range of about 5 to about 550 g/l of resin solids, the amount of the resin solids will tend to vary depending on the other ingredients comprising the composition and also on the specific latex or resin used. For many applications, good results can be achieved by utilizing about 50 to about 100 g/l of resin solids in the composition.

Optional ingredients can be added to the composition as desired. For example, it is believed that the present invention will be used most widely in applications where it is desired to apply pigmented coatings to the metallic substrate. For this purpose, suitable pigments can be included in the composition. Examples of pigments that can be used are carbon black, phthalocyanine blue, phthalocyanine green, quinacridone red, benzidine yellow, and titanium dioxide. The pigment should be added to the composition in an amount which imparts to the coating the desired color and/or the desired depth or degree of hue. It should be understood that the specific amount used will be governed by the specific pigment used and the color of coating desired. Excellent results have been achieved by using the aqueous dispersion in an amount such that the composition contains about 0.2 to about 3 g of furnace black/100 g of resin solids.

Many pigments are available in aqueous dispersions which may include surfactants or dispersing agents for maintaining the pigment particles in dispersed state. When utilizing such pigment dispersions, they should be selected so that the surfactant concentration in the aqueous phase of the composition is below the critical micelle concentration ("CMC"), preferably below the surfactant concentration which corresponds to the inflection point on a graph of surface tension versus the logarithm of surfactant concentration in the composition. Suitable pigmented compositions are illustrated in examples herein.

Colored coatings can be produced also by the use of dyes, examples of which include rhodamine derived dyes, methyl violet, safranine, anthraquinone derived dyes, nigrosine, and alizarin cyanine green. These are but a few examples of dyes that can be used.

Examples of other additives that may be used in the autodepositing composition are those generally known to be used in formulating paint compositions, for example, UV stabilizers, viscosity modifiers, etc.

If a surfactant is added to the composition, either as a component of the latex, or with a pigment dispersion, or with other ingredients or additives, the total amount of surfactant in the aqueous phase of the composition should preferably be maintained below the CMC. More preferably, the aqueous phase of the composition contains little or no surfactant.

In case a surfactant is utilized, the preferred surfactants are the anionic surfactants. Examples of suitable anionic surfactants are the alkyl, alkyl/aryl or naphthalene sulfonates, for example, sodium dioctylsulfosuccinate and sodium dodecylbenzene sulfonate.

In preparing the autodepositing composition, the constituents thereof can be admixed in any suitable way, for example, as described in U.S. Pat. No. 4,191,676. In preparing a bath of pigmented coating composition for use on an industrial scale, it is preferred that the bath be prepared by admixing:
A) one or more aqueous concentrates, each comprising from 350 to 550 g/l of resin particles, preferably the aforementioned combination of vinylidene chloride-containing and SBR resin particles, and about 10 to about 550 g/l of pigment; and
B) an aqueous concentrate prepared from about 0.4 to about 210 g/l of HF and a water soluble ferric-containing compound in an amount equivalent to about 1 to about 100 g/l of ferric iron.

The bath can be prepared by stirring water into concentrate(s) A) and thereafter admixing therewith the required amount of concentrate B) with stirring to provide a homogenous composition.

The preferred activating system, i.e., part B) in the paragraph above, comprises a ferric ion-containing compound and hydrofluoric acid. Thus, a preferred autodepositing composition comprises a soluble ferric ion containing compound in an amount equivalent to about 0.025 to about 3.5 g/l ferric iron, most preferably about 0.3 to about 1.6 g/l of ferric iron, and hydrofluoric acid in an amount sufficient to impart to the composition a pH within the range of about 1.6 to about 5.0. Examples of the ferric-containing compounds are ferric nitrate, ferric chloride, ferric phosphate, ferric oxide, and ferric fluoride, the last mentioned being preferred.

Various steps of the overall coating process in which the present invention is used can be like those of the prior art, except as noted herein. For example, cleaning of the metallic surface prior to coating can be in accordance with the teachings of U.S. Pat. No. 4,191,676. With respect to contacting the metallic surface with the autodepositing composition, it is believed that, for most applications, desired coating thicknesses can be obtained by immersing the metallic surface in the composition for a period of time within the range of about 30 seconds or even less to about 3 minutes. Good results have been achieved utilizing a time of immersion of not more than about 90 to about 120 seconds with compositions containing about 5 to about 10 wt % of resin solids. However, it should be understood that longer or shorter periods of time can be used. Agitating the composition aids in maintaining it uniform and in improving the uniformity of the coatings formed. With other factors held constant, heating of the composition will result in heavier coatings. However, satisfactory results can be obtained by operating the coating process at ambient temperature, and this is generally preferred for convenience.

In a typical industrial process, the freshly applied coating is rinsed with water or a reactive rinse after the coated surface has been withdrawn from the composition and before significant drying of the wet coating takes place. Water rinsing is effective in removing therefrom undesirable residual materials, such as acid and other ingredients of the composition, that adhere to the coated surface. If such materials are allowed to remain on the coated surface, they may adversely affect the quality of the coating. Further improvements in rendering the cured form of the coating more impermeable to water, as provided by reactive rinses as noted herein.

Exemplary means for applying a reaction rinse include spray, mist, and immersion, with the preferred means of applying such solution being immersion of the uncured coated surface in the solution for a period of time of about 5 seconds to about 5 minutes.

Generally, it is preferred to treat the wet autodeposited coatings according to this invention with a reaction rinse before curing them. Any reaction rinse known per se in the art, such as those containing hexavalent chromium, may suitably be thus used in connection with the basic invention. Preferably, the reaction rinse is alkaline, does not contain hexavalent chromium or other materials considered pollutants when discharged to surface waste water disposal streams, and independently preferably contains organic anions.

One highly preferred type of acid from which anions needed in the treatment solutions according to this invention may be derived is the diphosphonic acids. The general formula of a phosphonic acid is:

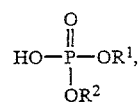

where $R^1$ is a monovalent covalently bonded moiety containing at least one carbon atom and optionally also containing other functional groups, and $R^2$ is either a hydrogen atom or a monovalent covalently bonded moiety containing at least one carbon atom and optionally also containing other functional groups, and may be the same as $R^1$ or different. Anions for use in this invention are preferably derived from phosphonic acids in which $R^2$ in the formula above is hydrogen. More preferably, the anions used in this invention are derived from acids having at least two ($H_2O_3P$) groups attached to a single carbon atom, e.g., from 1,1-diphosphonic acids having the general formula $(H_2O_3P)_2$—$CR^3R^4$, wherein each of $R^3$ and $R^4$ may be independently selected from hydrogen, hydroxyl, monovalent alkyl, monovalent substituted alkyl, and ($H_2O_3P$) groups. The most preferable anions are those of 1-hydroxyethylidene-1,1-diphosphonic acid, having the formula $C(OH)(CH_3)(PO_3H_2)_2$.

Other preferred organic anions for use in the treating solutions according to this invention are anions derived from citric, tartaric, and oxalic acids.

The pH of the solution used for treating an uncured autodeposited coating according to this invention is between 7 and 11, preferably between 7.5 and 10, more preferably between 8.2 and 9.0. The concentration of the anions, expressed as their stoichiometric equivalent of the corresponding organic acid, is preferably between 0.01 and 5%, more preferably between 0.05 and 1.5%, depending on metal substrate.

In order to achieve the preferred pH values, the acid may be neutralized with a base, preferably a fugitive base, i.e., a base which volatilizes at or below the temperature used in curing of the autodeposited coating that is treated, and additional base may be added to achieve an alkaline pH. The most preferred base for use in reactively rinsing a wet autodeposited coating according to this invention is ammonium hydroxide.

Higher organic acid anion concentrations and higher pH values within the ranges given above are generally preferred for higher film thickness of the autodeposited coating to be treated according to the invention. Uncured film thickness treated are preferably from 12 to 50 $\mu$m, more preferably from 18 to 31 $\mu$m.

It is preferable, as already noted, if the alkaline components of the treatment solutions according to the invention are volatile or "fugitive". Aqueous ammonium hydroxide and ammonium bicarbonate exemplify such fugitive bases, but the latter is less preferred, because when using it there is greater danger of blisters in the autodeposited coating after oven curing.

After simple or reactive rinsing, the autodeposited coating should preferably be cured. Fusion of the resinous coating renders it continuous, thereby improving its resistance to corrosion and its adherence to the underlying metallic surface.

The conditions under which the curing and/or fusion operation is carried out depend somewhat on the specific resin employed. In general, it is desirable to apply heat to fuse the resin, although some of the vinylidene chloride-containing resins described above can be cured at room temperature. Generally, the corrosion resistance, hardness and solvent resistance properties of coatings fused at elevated temperatures have been observed to be better than coatings which have been air dried. However, there are applications where air dried coatings can be used satisfactorily. The fusion of the coating should be carried out under temperature and time conditions which do not adversely affect the desired properties of the coating. Exemplary conditions used in fusing the vinylidene chloride-containing coatings are temperatures within the range of about 20° C. to 120° C. for periods of time within the range of about 10 to 30 minutes, depending on the mass of the coated part. Baking the coating for a period of time until the metallic surface has reached the temperature of the heated environment has been used effectively.

When baked in an oven, the coating reaches the proper "curing" or heating temperature for the full development of coating properties when the metal part reaches that temperature. For this reason, parts that are constructed of thicker steel require longer times to reach the required temperature. For massive parts, it may not be possible to reach the required temperature without deleteriously affecting the coating and causing it to degrade.

In some cases, it is possible to overcome this problem by resorting to infrared radiation curing. In this case, it is possible to cure the coating without simultaneously raising the temperature of the metal to the required temperature. However, infrared radiation curing is practicable only for simple geometric shapes, since the area to be cured must be exposed to the infrared. In using infrared radiation curing, all coated surfaces must be accessible to the infrared source, that is, the entire coated surface must "see" the infrared.

The practice and benefits of this invention may be further appreciated from the following non-limiting examples and comparison examples.

Examples and Comparison Examples

The metal workpieces coated by autodeposition were flat panels of cold rolled steel. The process sequence used was:

1. Spray clean for 60 seconds ("sec") at 60° C. with a conventional aqueous alkaline cleaner having a free alkalinity of 6–15 milliliters ("ml") and a total alkalinity not more than 3 times the free alkalinity when a sample of 10 ml of the cleaner is titrated with 0.1N HCl solution, using phenolphthalein indicator for free alkalinity and bromphenol blue indicator for total alkalinity.
2. Allow to drain for 60 sec.
3. Dip clean for 120 sec at 65.6° C. with a conventional aqueous alkaline cleaner having a free alkalinity of 2–13 milliliters ("ml") and a total alkalinity not more than 3 times the free alkalinity when a sample of 10 ml of the cleaner is titrated with 0.1N HCl solution, using phenolphthalein indicator for free alkalinity and bromphenol blue indicator for total alkalinity.
4. Allow to drain for 60 sec.
5. Rinse with tap water at ambient temperature for 60 sec.
6. Allow to drain for 60 sec.
7. Rinse with deionized water at ambient temperature for 60 sec.
8. Allow to drain for 135 sec.
9. Dip coat for 120 sec. in an autodeposition bath containing 1.8 grams per liter ("g/L") of ferric fluoride, 5 g/L of AQUABLACK TM 255 carbon black pigment (commercially available from Borden Chemical Company), sufficient resin solids from latexes as shown in the tables below to yield 5.2±0.2% of total solids in the bath, sufficient hydrogen peroxide to maintain an oxidation potential of 350±20 millivolts more oxidizing than a silver-saturated silver chloride reference electrode on a platinum measuring electrode immersed in the bath, and sufficient hydrofluroic acid to maintain a reading of 250±25 microamps on a LINE-GUARD TM 101 Meter.
10. Allow to drain for 60 sec.
11. Dip rinse in tap water at ambient temperature for 60 sec.
12. Allow to drain for 135 sec.
13. Dip for 60 sec. at ambient temperature into a reaction rinse composition, as specifically noted below.
14. Allow to drain for 60 sec.
15. Dry and cure in an oven at 110° for 20 minutes.

Initial adhesion was measured according to method GM 9071P and adhesion after water soak (2 hrs at 38° C.) was measured according to American Society for Testing and Materials ("ASTM") B117-85. Reverse impact testing was performed according to ASTM D 2794-84.

Corrosion testing was conducted according to the following specifications: salt spray—ASTM D 1654; scribe/scab—GM 9511P; and gravelometer/scab—GM 9508P (chip resistance of coatings) followed by GM 9511P. Replicate panels were run for each test.

The compositions of reaction rinses A, B, and C were as follows:

A: 9.6% solution of ammonium bicarbonate in water.

B: 15% solution in water of 1-hydroxyethylidene-1,1-diphosphonic acid, neutralized with ammonium hydroxide to a pH of 8.6±0.2.

C: 15% solution in water of citric acid, neutralized with ammonium hydroxide to a pH of 8.6±0.2.

Properties of various SBR latexes, most suitable for use in the invention, including those used in the examples and comparison examples reported below in more detail, are shown in Table 1. Various autodeposition bath compositions, reaction rinses, and some resulting corrosion, adhesion, and/or impact test results, the latter including results before and after heat treatments designed to measure the thermal stability of the autodeposited coatings, are shown in Tables 2-7.

TABLE 1

STYRENE-BUTADIENE LATEXES SCREENED IN AUTODEPOSITION

| SBR Latex | Styrene/ Butadiene Ratio[1] | $t_g$ in · C[1] | pH | Surface Tension in Dynes per Cm | Average Particle Size, μm | Mechanical Stability of Latex[1] | Emulsifier Type | Stable in Bath? | Autodeposition? |
|---|---|---|---|---|---|---|---|---|---|
| 76 RES 4002 | 65/35 | −7 | 8.2 | 50[2] | 0.15 | | Anionic | Yes | Yes |
| 76 RES 4076 | 65/35 | −7 | 9.0 | 58[2] | 0.15 | | Anionic | Yes | Yes |
| 76 RES 4151 | 45/55 | −30 | 9.0 | 54[2] | 0.15 | | Anionic | No | Yes |
| 76 RES 4170 | 65/35 | −7 | 9.0 | 42[2] | 0.15 | | Anionic | Shear Sens. | Yes |
| 76 RES 4470 | 67/33 | −6 | 8.7 | 50[2] | 0.15 | | Anionic | Yes | Rinse-off |
| 76 RES 5550 | 45/55 | −30 | 8.7 | 59[2] | 0.15 | | Anionic | Yes | Yes |
| 76 RES 9410 | 25/75 | −61 | 8.7 | 51[2] | 0.15 | | Anionic | Yes | Rinse-off— |
| DAREX 510L | 67/33 | 0 | 8.5 | 39[2] | 0.2 | Excel. | Anionic | Yes | Yes |
| DAREX 529L | | −19 | 9.5 | 40 | 0.2 | Excel. | Anionic | Yes | Yes |
| DAREX 537LNA | 37/63 | −45 | 9.0 | 35 | | Excel. | Anionic | Yes | Yes |
| DAREX 620L | 47/53 | −23 | 10.5 | 50 | 0.15 | Fair | Rosin acid | Yes | No |
| DAREX 643L | 85/15 | 46 | 10.5 | 63 | | Good | Fatty acid | Yes | Irregular coating |
| DL 238NA | | 11 | 7-8 | 47[2] | 0.12 | Excel. | | Yes | Yes |
| DL 249NA[3] | | −8 | 7-8 | | 0.12 | Good | | Yes | Rinse-off |
| DL 261NA | | 12 | 6-7 | 41[2] | 0.12 | Excel. | | Yes | Rinse-off |
| DL 313NA | | | 8-9 | | 0.16 | | | Yes | Yes |

Footnotes for Table 1

[1]Data taken from literature or other information supplied by the manufacturer of the latex. The ratios are by weight.

[2]These values were measured in applicant's laboratories. Other values in this column were taken from literature supplied by the manufacturer of the latex.

[3]This was a vinylidene chloride - butadiene copolymer rather than an SBR.

General Notes for Table 1

The "76 RES ™" latexes are commercially available from Rohm & Haas, Inc. and are reported by their supplier to contain 1-2% carboxylation. The "DAREX ™" latexes are commercially available from W. R. Grace & Co. The "DL" latexes are commercially available from Dow Chemical Co.

"Cm" = Centimeter; "Shear Sens." = Shear Sensitive; "Excel." = Excellent. Blank spaces in the table indicate that information was not available, or that the particular information that would normally be in the space does not apply to the particular row of the table, as with comparison examples and the like.

TABLE 2

PHYSICAL TEST RESULTS FROM AUTODEPOSITED COATINGS INCLUDING SOME LATEXES FROM TABLE 1 BLENDED WITH POLY{VINYLIDENE CHLORIDE} RESIN

| Resin Type in Coating | Styrene/ Butadiene Ratio | $t_g$ in · C | Dry Film Thickness, μm | Percent Lose in Adhesion[1] In | WS | Reverse Impact Inch- Pounds | Rating After Salt Spray Test (1000 Hr) | Rating After Scribe/Scab[2] | Rating After Gravel/ Scab Test[3] |
|---|---|---|---|---|---|---|---|---|---|
| PVDC Base | | | 18 | 0 | 0 | 150 | 1-2 | 4.5 | 0[4] |
| DAREX 537 LNA | 37/63 | −45 | 19 | 0 | 60 | 100 | 1-2 | 6.5 | = |
| 76 RES 5550 | 45/55 | −30 | 19 | 0 | 0 | 160 | 1-2 | 5.5 | = |
| DAREX 529L | | −19 | 19 | 0 | 1 | 160 | 1-2 | 4.8 | = |
| 76 RES 4076 | 65/35 | −7 | 18 | 0 | 1 | 160 | 1-2 | 2.1 | +1 |
| DAREX 510L | 67/33 | 0 | 19 | 0 | 0 | 160 | 1-2 | 3.0 | >+2 |
| DL 238 NA | | 11 | 19 | 2 | 1 | 160 | 1-2 | 3.1 | +2 |
| DAREX 643L | 85/15 | 46 | 19 | 0 | 1 | 40 | 1-6 F + 9 | 3.6 | = |

TABLE 2-continued

PHYSICAL TEST RESULTS FROM AUTODEPOSITED COATINGS INCLUDING SOME LATEXES FROM TABLE 1 BLENDED WITH POLY{VINYLIDENE CHLORIDE} RESIN

| Resin Type in Coating | Styrene/ Butadiene Ratio | $t_g$ in · C | Dry Film Thickness, μm | Percent Lose in Adhesion[1] In | Percent Lose in Adhesion[1] WS | Reverse Impact Inch- Pounds | Rating After Salt Spray Test (1000 Hr) | Rating After Scribe/Scab[2] | Rating After Gravel/ Scab Test[3] |
|---|---|---|---|---|---|---|---|---|---|
| DL 313 NA | | | 18 | 0 | 1 | 160 | 1–1, 2s | 3.0 | +1 |

Footnotes for Table 2
[1] Coating loss after tape test - initially ("In") and after a 2 hour water-soak at 38° C. ("WS").
[2] Average creepage from scribe (3 panels) after 20-cycle GM 9511P corrosion testing.
[3] Visual rating after 30-cycle scab testing. Rating scale: = equivalent to control; +1 is >10% better than control; +2 is >20% better than control.
[4] Actual rating.
General Notes for Table 2
The composition of the "PVDC Base" autodeposition bath was as given in the main text, with all of the resin solids derived from DARAN ™ SL-143 latex. The autodeposition baths for the other entries in the "Resin Type..." column were prepared by adding to the PVDC Base autodeposition bath composition as given above a sufficient amount of the latex type noted in the "Resin Type..." column to provide 10% of the total resin solids from the latex shown in the "Resin Type..." column. Reaction Rinse Type A as described in the main text, at a concentration of 1% by volume of the concentrate in water, was used for all the coatings reported in this table. The added latex resins are shown in the "Resin Type..." column by the same abbreviations as in the first column of Table 1, except that "537LNA" = DAREX ™ 537LNA as shown in Table 1.

TABLE 3

POLYMER BLEND/REACTION RINSE OPTIMIZATION STUDY - MODIFIED BOX-BENKEN DESIGN

| Resin Type in Coating | Reaction Rinse Type | Reaction Rinse Concentration | Dry Film Thickness, μm | Rating After Salt Spray Test (1000 Hr) | Rating After Scribe/ Scab Test[1] | Rating After Gravel Test | Rating After Gravel/ Scab Test[2] |
|---|---|---|---|---|---|---|---|
| PVDC Base | A | 1 v % | 23 | 0–2, 3s | 6.4 | 7 | 1[6] |
| PVDC Base | A | 1 v % | 22 | 0–2 | 6.5 | 7 | 1[6] |
| 8% 510L | A | 1 v % | 19 | 1–2 | 5.6[4,5] | 7 | = |
| 8% 510L | B | 0.7% | 20 | 0–2 | 5.9[5] | 7 | +2 |
| 8% 510L | C | 0.7% | 22 | 0–2 | 5.1 | 6 | +2 |
| 10% 510L | A | 0.5 v % | 20 | 0–1, 2s | 5.1[4] | 7 | +1 |
| 10% 510L | A | 1 v % | 22 | 0–2 | 5.9[4] | 6 | = |
| 10% 510L | A | 1.5 v % | 23 | 0–2 | 6.9 | 6 | +1 |
| 10% 510L | B | 0.7% | 22 | 0–2 (VF8)[3] | 7.1 | 6 | +2 |
| 10% 510L | C | 0.7% | 20 | 1–2 | 5.7 | 7 | +2 |
| 12% 510L | A | 0.5 v % | 22 | 0–1, 2s | 4.0 | 7 | >+2 |
| 12% 510L | B | 0.7% | 23 | 0–2 | 4.5 | 7 | >+2[7] |
| 12% 510 | C | 0.7% | 22 | 0–1, 2s | 4.8 | 7 | >+2[7] |
| 8% 4076 | A | 0.5 v % | 20 | 1–1, 2s | 5.0 | 7 | = |
| 8% 4076 | B | 0.7% | 20 | 0–2 | 7.0[4,5] | 7 | = |
| 10% 4076 | A | 0.5 v % | 20 | 0–1, 2s | 4.7 | 6 | −2 |
| 10% 4076 | A | 1 v % | 20 | 0–1 | 6.4[4] | 7 | −2 |
| 10% 4076 | A | 1.5 v % | 19 | 1–1, 2s | 4.7[4] | 7 | −2 |
| 10% 4076 | B | 0.7% | 20 | 0–2 | 6.1[4] | 7 | = |
| 10% 4076 | C | 0.7% | 20 | 0–1, 2s | 3.4[4] | 7 | = |
| 12% 4076 | A | 0.5 v % | 20 | 0–1 | 5.0[4] | 7 | −1 |
| 12% 4076 | B | 0.7% | 22 | 0–2 (VF + 9)[3] | 4.4[4] | 7 | = |
| 12% 4076 | C | 0.7% | 22 | 0–1, 2s | 4.7 | 7 | = |

Footnotes for Table 3
[1] Average creepage from scribe (3 panels) after 20-cycle GM 9511P corrosion testing. (Maximum creepage measured in four regions of scribe and averaged).
[2] Average rating (3 panels) after 20-cycle scab testing. Rating scale: = equivalent to control; +1 is >10% better than control; +2 is >20% better than control; −2 is >20% worse than control.
[3] One of two panels showed blistering in salt spray.
[4] Field rust spots.
[5] Blisters/rust along scribe.
[6] Actual ASTM gravelometer/scab rating.
[7] Best gravelometer/scab performance of all coatings in this group.
General Notes for Table 3
The composition of the "PVDC Base" autodeposition bath was as given in the main text, with all of the resin solids derived from DARAN ™ SL-143 latex. The autodeposition baths for the other entries in the "Resin Type..." column were prepared by adding to the PVDC Base autodeposition bath composition as given above a sufficient amount of the latex type noted in the "Resin Type..." column to produce the percentage value shown in the "Resin Type..." column for the percent of the added resin solids in the total resin solids (i.e., the solids of the added latex plus the solids of the DARAN ™ SL-143 latex in the PVDC Base). The added latex resins are abbreviated in the "Resin Type..." column as follows: "510L" = DAREX ™ 510L in Table 1; "4076" = Unocal 76 ™ RES 4076 in Table 1. "v %" = percent by volume.

TABLE 4

POLYMER BLEND/REACTRON RINSE OPTIMIZATION STUDY - MODIFIED 2-LEVEL FACTORIAL DESIGN

| Resin Type in Coating | Reaction Rinse Type | Reaction Rinse Concentration | Dry Film Thickness, μm | Percent Loss in Adhesion[1] In | Percent Loss in Adhesion[1] WS | Reverse Impact, Inch-Pounds | Rating After Salt Spray Test (1000 Hr) | Rating After Scribe/ Scab[2] | Rating After Gravel/Scab Test[3] |
|---|---|---|---|---|---|---|---|---|---|
| PVDC Base | A | 0.5 v % | 19 | 0 | 0 | 140 | 1–2 | 4.1 | Control |
| PVDC Base | A | 1 v % | 20 | 0 | 70 | 140 | 1–2 | 4.7 | 1[6] |

TABLE 4-continued

POLYMER BLEND/REACTRON RINSE OPTIMIZATION STUDY - MODIFIED 2-LEVEL FACTORIAL DESIGN

| Resin Type in Coating | Reaction Rinse Type | Concentration | Dry Film Thickness, μm | Percent Loss in Adhesion[1] In | WS | Reverse Impact, Inch-Pounds | Rating After Salt Spray Test (1000 Hr) | Rating After Scribe/ Scab[2] | Rating After Gravel/Scab Test[3] |
|---|---|---|---|---|---|---|---|---|---|
| PVDC Base | A | 1 v % | 20 | — | — | — | 1-2 | 4.7 | 2[6] |
| PVDC Base | B | 0.33% | 23 | 0 | 0 | 160 | 1-2 | 4.5 | +1 |
| PVDC Base | C | 0.33% | 20 | 0 | 80 | 100 | 1-2VF8[4] | 3.6 | +1 |
| PVDC Base | C | 0.7% | 20 | 0 | 60 | 160 | 1-2, 3s | 4.3 | = |
| 8% 510L | A | 0.5 v % | 22 | 0 | 0 | 160 | 0-1 | 4.6 | +1 |
| 8% 510L | A | 1 v % | 22 | 0 | 0 | 160 | 0-1, 2s | 4.0 | +1 |
| 8% 510L | B | 0.33% | 23 | 0 | 0 | 160 | 1-2 | 4.9 | +1 |
| 8% 510L | C | 0.33% | 22 | 0 | 40 | 160 | 1-2 | 4.3 | +1 |
| 8% 510L | C | 0.7% | 22 | 0 | 80 | 160 | 1-2 | 4.6 | +1 |
| 11% 510L | A | 0.5 v % | 22 | 0 | 0 | 160 | 0-1, 2s | 6.4 | +2 |
| 11% 510L | A | 1 v % | 22 | 0 | 0 | 160 | 1-1 | 3.0 | +2 |
| 11% 510L | B | 0.33% | 23 | 0 | 0 | 160 | 0-1, 2s | 6.1 | +2 |
| 11% 510L | B | 0.7% | 23 | 0 | 0 | 160 | 0-1, 2s | 5.5 | +2 |
| 11% 510L | C | 0.33% | 23 | 0 | 90 | 160 | 0-1, 2s | 4.4 | +2 |
| 11% 510L | C | 0.7% | 22 | 0 | 100 | 160 | 1-2 | 4.4 | +2 |
| 8% 4076 | A | 1 v % | 22 | 0 | 0 | 160 | 1-1, 2s | 4.0 | = |
| 8% 4076 | B | 0.33% | 20 | 0 | 0 | 160 | 1-2 | 4.7 | = |
| 8% 4076 | B | 0.7% | 22 | 0 | 0 | 160 | 2-2 | 5.1 | = |
| 8% 4076 | C | 0.33% | 22 | 0 | 5 | 160 | 1-2VF6[4] | 4.2 | +1 |
| 11% 4076 | A | 0.5 v % | 20 | 0 | 0 | 160 | 1-2 | 5.9 | = |
| 11% 4076 | A | 1 v % | 20 | 0 | 0 | 160 | 1-1, 2s | 2.9 | = |
| 11% 4076 | B | 0.33% | 22 | 0 | 0 | 160 | 1-2 | 5.7 | +1 |
| 11% 4076 | B | 0.7% | 23 | 0 | 0 | 160 | 0-1, 2s | 5.8 | +1 |
| 11% 4076 | C | 0.33% | 22 | 0 | 1 | 160 | 1-2 | 4.2 | = |
| 11% 4076 | C | 0.7% | 20 | 0 | 5 | 160 | 1-2 | 3.7 | = |

Footnotes for Table 4
[1] Coating loss after tape test - initially ("In") and after a 2 hour water-soak at 38° C. ("WS").
[2] Average creepage from scribe (3 panels) after 20-cycle GM 9511P corrosion testing.
[3] Average rating (3 panels) after 20-cycle scab testing.
[4] One of two panels showed blistering.
[5] Blisters/rust along scribe.
[6] Actual rating.
General Notes for Table 4
The same general notes as for Table 3 apply to this table.

TABLE 5

OPTIMIZATION OF CONCENTRATION OF SBR IN POLYMER BLENDS

| Resin Type in Coating | Reaction Rinse Type | Concentration | Dry Film Thickness, μm | Percent Loss in Adhesion[1] In | WS | Rating After Salt Spray Test (1000 Hr) | Rating After Scribe/ Scab[2] | Gravel Test Rating | Rating After Gravel/ Scab Test[3] |
|---|---|---|---|---|---|---|---|---|---|
| PVDC Base | A | 1 v % | 20 | 0 | 0 | 1-2 | 4.8 | 7 | 2[4] |
| 8% 510L | A | 0.5 v % | 20 | 0 | 0 | 1-1, 2s | 3.8 | 7.5 | +1 |
| 10% 510L | A | 0.5 v % | 20 | 0 | 0 | 1-2 | 4.6 | 7 | +1 |
| 12% 510L | A | 0.5 v % | 22 | 0 | 0 | 1-1, 2s | 3.3 | 7 | +1 |
| 14% 510L | A | 0.5 v % | 20 | 0 | 5 | 1-1, 2s | 4.3 | 7 | +1 |
| 8% 4076 | A | 0.5 v % | 20 | 0 | 0 | 0-1 | 4.6 | 6.5 | = |
| 10% 4076 | A | 0.5 v % | 20 | 0 | 0 | 1-2 | 4.2 | 7 | = |
| 12% 4076 | A | 0.5 v % | 20 | 0 | 0 | 1-1 | 4.1 | 7 | = |
| 14% 4076 | A | 0.5 v % | 22 | 0 | 0 | 1-1, 2s | 4.2 | 7 | = |

Footnotes for Table 5
[1] Coating loss after tape test - initially ("In") and after a 2 hour water-soak at 38° C. ("WS").
[2] Average creepage from scribe (2 panels) after 20-cycle GM 9511P corrosion testing.
[3] Visual rating (3 panels) after 30-cycle scab testing. Rating scale: = equivalent to control; +1 is >10% better than control.
[4] Actual rating.
General Notes for Table 5
The same general notes as for Table 3 apply to this table.

TABLE 6

OPTIMIZATION OF CONCENTRATION OF SBR IN POLYMER BLENDS (WITH SHORTER TEST CYCLES THAN IN TABLE 5)

| % SBR in Blend | Reverse Impact, Inch-Pounds | Rating after Salt Spray Test (650 Hr) | Rating after Scribe-Scab Test (18 Cycles) | Rating after Gravel-Scab Test (20 Cycles) |
|---|---|---|---|---|
| 0 | 150 | 1-1 | 4.4[1] | Control |
| 8 | 160 | 1-1 | 3.4[2] | +1 |
| 10 | 160 | 1-1 | 6.7[2] | +1 |
| 12 | 160 | 1-1 | 4.5[2] | +2 |
| 14 | 160 | 1-1 | 5.8[2] | +2 |
| 16 | 160 | 1-1 | 5.4[3] | +3 [+4] |
| 18 | 160 | 1-1 2s | 4.8[3] | +3 [+4] |
| | | FM9 | | |

TABLE 6-continued

OPTIMIZATION OF CONCENTRATION OF SBR IN POLYMER BLENDS (WITH SHORTER TEST CYCLES THAN IN TABLE 5)

| % SBR in Blend | Reverse Impact, Inch-Pounds | Rating after Salt Spray Test (650 Hr) | Rating after Scribe-Scab Test (18 Cycles) | Rating after Gravel-Scab Test (20 Cycles) |
|---|---|---|---|---|
| 20 | 160 | 1–1, FM9 | 5.9[3] | +3[+4] |

Footnotes for Table 6
[1]There was one rust spot on only one of the two panels tested.
[2]There was slight blistering on the edge of the panels placed in the holder for this test.
[3]There was heavier blistering than for note 2 on the edge of the panels placed in the holder for this test.
[4]There were small blisters on around impact sites on the panels for these tests.
General Notes for Table 6
"FM9" is an ASTM blister rating.
The figures in the "Scribe-Scab" column are the average (2 panels) maximum creepage from scribe in millimeters after 18-cycle GM 9511P corrosion testing. The figures in the "Gravel Scab" column have the same meaning as in Footnote 2 of Table 3, except that 4 panels were used instead of 3 and +3 is >30% better than control.
The coating bath for 0% SBR was the same as the "PVDC Base" in Table 3, and the other coating baths were made from this base in the manner described in the General Notes for Table 3, except that the SBR latex used was always DAREX ™ 510L. The coating sequence included a reaction rinse with a 1.0 v % solution of Reaction Rinse Type A.
All the panels showed no loss of adhesion in a tape test, either initially or after a 2 hour soak in water at 38° C.

TABLE 7

RESULTS OF HEAT RESISTANCE TESTS WITH VARIOUS RESINS AND RESIN BLENDS

| % SBR in Resin | Reaction Rinse Type | Conc. | Initial | Reverse Impact in Inch-Pounds After 30 Minutes | Aged |
|---|---|---|---|---|---|
| Samples Heated 20 Minutes at 149° C. - Aged 10 Days ||||||
| 0 | A | 1 v % | 140 | 100 | 20 |
| 0 | A | 0.5 v % | 140 | 100 | 10 |
| 0 | B | 0.7% | 160 | 160 | 20 |
| 0 | B | 0.33% | 160 | 140 | 40 |
| 0 | C | 0.7% | 160 | 140 | 20 |
| 0 | C | 0.33% | 100 | 100 | 20 |
| 8 | A | 1 v % | 160 | 160 | 120 |
| 8 | A | 0.5 v % | 160 | 160 | 60 |
| 8 | B | 0.7% | 160 | 160 | 160 |
| 8 | B | 0.33% | 160 | 160 | 80 |
| 8 | C | 0.7% | 160 | 160 | 80 |
| 8 | C | 0.33% | 160 | 160 | 40 |
| 11 | A | 1 v % | 160 | 160 | 140 |
| 11 | A | 0.5 v % | 160 | 160 | 60 |
| 11 | B | 0.7% | 160 | 160 | 160 |
| 11 | B | 0.33% | 160 | 160 | 160 |
| 11 | C | 0.7% | 160 | 160 | 80 |
| 11 | C | 0.33% | 160 | 160 | 100 |
| Samples Heated 25 Minutes at 177° C. - Aged 1 Day ||||||
| 0 | A | 0.5 v % | 140 | 100 | <20 |
| 0 | B | 0.7% | 160 | 100 | <20 |
| 0 | C | 0.7% | 160 | 140 | <20 |
| 0 | C | 0.33% | 100 | 100 | <20 |
| 8 | A | 1 v % | 160 | 160 | <20 |
| 8 | A | 0.5 v % | 160 | 120 | <20 |
| 8 | B | 0.7% | 160 | 120 | <20 |
| 8 | B | 0.33% | 160 | 140 | <20 |
| 8 | C | 0.7% | 160 | 120 | <20 |
| 8 | C | 0.33% | 160 | 140 | <20 |
| 11 | A | 1 v % | 160 | 140 | <20 |
| 11 | A | 0.5 v % | 160 | 140 | <20 |
| 11 | B | 0.7% | 160 | 160 | <20 |
| 11 | B | 0.33% | 160 | 160 | <20 |
| 11 | C | 0.7% | 160 | 140 | <20 |
| 11 | C | 0.33% | 160 | 140 | <20 |
| Heated 30 Minutes at 149° C. Aged 96 Hours ||||||
| 0 | A | 1 v % | 160 | 80 | <20 |
| 12 | A | 0.5 v % | 160 | 140 | 20 |
| 12 | B | 0.33% | 160 | 160 | 20 |
| 100 | A | 1 v % | 160 | <20 | <20 |
| Heated 30 Minutes at 121° C. Aged 96 Hours ||||||
| 0 | A | 1 v % | 160 | 160 | 160 |
| 12 | A | 0.5 v % | 160 | 160 | 160 |
| 12 | B | 0.33% | 160 | 160 | 160 |
| 100 | A | 1 v % | 160 | <20 | <20 |
| Heated 30 Minutes at 135° C. Aged 10 Days ||||||
| 0 | A | 1 v % | 160 | 160 | 100 |
| 12 | A | 0.5 v % | 160 | 160 | 160 |
| 12 | B | 0.33% | 160 | 160 | 160 |
| 100 | A | 1 v % | 160 | <20 | <20 |

General Notes for Table 7
The composition of the autodeposition baths with 0% SBR was as given in the main text, with all of the resin solids derived from DARAN ™ SL-143 latex. The composition of the autodeposition baths with 100 SBR was as given in the main text, with all of the resin solids derived from DAREX ™ 510L latex. The autodeposition baths for intermediate percentages of SBR were derived from the bath composition noted for 0% SBR by adding to it a sufficient amount of DAREX ™ 510L latex to achieve the stated percentage of SBR in the total of SBR and PVDC resin solids. Coated panels after drying as noted for the general experimental process sequence in the main text were heated for the time and at the temperature shown by placement in a preheated oven at the stated temperature, then removal from the oven after the stated time. Reverse impact tests were performed on the heated samples after the time intervals noted. Initial values were measured before heating the samples. "v %" = percent by volume; "conc." = Concentration

The invention claimed is:

1. A process for forming an autodeposited organic coating on the metallic parts of the surface of an object, said process comprising steps of contacting the metallic surface to be coated with an acidic aqueous liquid autodepositing composition comprising dispersed organic resin solids and an activator component, to produce on said metallic surface an uncured intermediate coating and subsequently drying said uncured intermediate coating to produce a final autodeposited organic coating, wherein the improvement comprises the fact that the dispersed organic resin solids consist essentially of:

(A) from about 85% to about 89% of polymers selected from the group consisting of polymers that contain (i) from about 80 to about 99% of residues of vinylidene chloride; (ii) from about 0.1 to about 5% of a component selected from sulfonic acids and their salts having the formula R—Z—(CH$_2$)$_n$—(SO$_3$)−M+, wherein R represents vinyl or lower alkyl-substituted vinyl Z represents one of the difunctional group:

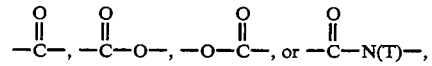

where T represents hydrogen or an alkyl group, n is an integer from 1 to 6, and M+ is hydrogen or an alkali metal cation; and, optionally, (iii) up to 19% of residues from the polymerization of comonomers selected from the group consisting of vinyl chloride, acrylonitriles and methacrylonitriles, and acrylamides and methacrylamides; and (B) from about 11 to about 15% of styrene-butadiene copolymers in which the ratio of styrene to butadiene is within the range from about 6:4 to about 7:3.

2. A process according to claim 1, wherein component (B) constitutes from about 12 to about 14% of the total of components (A) and (B) and is selected from styrene-butadiene copolymers in which the ratio of styrene to butadiene is within the range from 65:35 to 69:31.

3. A process according to claim 2, comprising a step of contacting the intermediate coating, before drying it, with an aqueous adhesion and corrosion resistance promoting solution having a pH between about 8.2 and about 9.0 and consisting essentially of water, fugitive base, and from about 0.5 to about 1.5% of anions derived from acids selected from the group consisting of citric acid, tartaric acid, oxalic acid, and 1-hydroxyethylidene-1,1-diphosphonic acid.

4. A process according to claim 1, comprising a step of contacting the intermediate coating, before drying it, with an aqueous adhesion and corrosion resistance promoting solution having a pH between about 7 and about 11 and consisting essentially of water, base, and from about 0.01 to about 5% of anions of multifunctional organic acids.

5. A process according to claim 3, wherein the autodeposition bath used comprises from 50 to 100 g/L of total organic resin solids, at least about 1.0 g/L of ferric fluoride, and sufficient hydrofluoric acid to impart to the autodeposition bath a pH within the range from about 1.6 to about 5.0.

6. A process according to claim 3, wherein the autodeposition bath used consists essentially of water and about 1.8 g/L of ferric fluoride, 5 g/L of carbon black pigment, from about 5.0 to about 5.4% of total organic resin solids in the bath, hydrogen peroxide in such an amount as to produce an oxidation potential of from about 330 to about 370 millivolts more oxidizing than a silver-saturated silver chloride reference electrode on a platinum measuring electrode immersed in the bath, and sufficient hydrofluoric acid to impart to the autodeposition bath a pH within the range from about 1.6 to about 5.0.

7. An article of manufacture comprising metallic portions covered by an adherent organic outer coating consisting essentially of organic resin binders, and, optionally, pigment, wherein said organic resin binders consist essentially of:

(A) from about 85% to about 89% of polymers selected from the group consisting of polymers that contain (i) from about 80 to about 99% of residues of vinylidene chloride; (ii) from about 0.1 to about 5% of a component selected from sulfonic acids and their salts having the formula $R-Z-(CH_2)_n-(SO_3)^-M^+$, wherein R represents vinyl or lower alkyl-substituted vinyl, Z represents one of the difunctional groups:

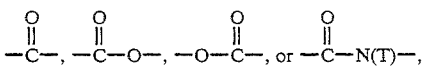

where T represents hydrogen or an alkyl group, n is an integer from 1 to 6, and $M^+$ is hydrogen or an alkali metal cation; and, optionally, (iii) up to 19% of residues from the polymerization of comonomers selected from the group consisting of vinyl chloride, acrylonitriles and methacrylonitriles, and acrylamides and methacrylamides; and (B) from about 11 to about 15% of styrene-butadiene copolymers in which the ratio of styrene to butadiene is within the range from about 6:4 to about 7:3.

8. A process according to claim 1, comprising a step of contacting the intermediate coating, before drying it, with an aqueous adhesion and corrosion resistance promoting solution having a pH between about 7.5 and about 10 and consisting essentially of water, fugitive base, and from about 0.2 to about 2.0% of anions derived from acids selected from the group consisting of citric acid, tartaric acid, oxalic acid, and 1-hydroxyethylidene-1,1-diphosphonic acid.

* * * * *

UNITED STATES PATENT AND TRADEMARK OFFICE
CERTIFICATE OF CORRECTION

PATENT NO. : 5,427,863
DATED : Jun. 27, 1995
INVENTOR(S) : Elizabeth J. Siebert

It is certified that error appears in the above-indentified patent and that said Letters Patent is hereby corrected as shown below:

In col. 10, line 63, delete [RJ] and insert --$R^3$--.

In cols. 14-15, table 2 & table 2 (continued), Percent Lose in Adhesion, delete [Lose] and insert --Loss--.

In col. 20, table 7 (continued), General Notes For Table 7, third line, between "100" and "SBR", insert --%--.

In col. 20, line 46, after "vinyl", insert --,--.

In col. 15, table 3, column 1, "12% 510", delete [510] and insert --510L--.

Signed and Sealed this

Twenty-ninth Day of October 1996

BRUCE LEHMAN

*Attest:*

*Attesting Officer*   *Commissioner of Patents and Trademarks*